No. 805,579. PATENTED NOV. 28, 1905.
A. U. PATCHEN.
ATTACHMENT FOR FLEXIBLE SHAFT CASINGS.
APPLICATION FILED JAN. 14, 1905.

WITNESSES:
B. E. Robinson
R. M. Wheeler

INVENTOR:
Alvah U. Patchen
BY:
Howard P. Denison
ATTORNEY.

UNITED STATES PATENT OFFICE.

ALVAH U. PATCHEN, OF SYRACUSE, NEW YORK.

ATTACHMENT FOR FLEXIBLE-SHAFT CASINGS.

No. 805,579.     Specification of Letters Patent.     Patented Nov. 28, 1905.

Application filed January 14, 1905. Serial No. 241,162.

*To all whom it may concern:*

Be it known that I, ALVAH U. PATCHEN, of Syracuse, in the county of Onondaga, in the State of New York, have invented new and useful Improvements in Attachments for Flexible-Shaft Casings, of which the following, taken in connection with the accompanying drawings, is a full, clear, and exact description.

This invention relates to an attachment for flexible-shaft casings for preventing sharp or abrupt bends or kinks in the shaft or casing at the junction of the shaft with the coupling. These couplings are attached to the ends of the casing and serve to hold the flexible shaft in operative relation to the driving and driven elements and are therefore more or less rigid. The shafts and their casings are, in the hands of the operator, twisted and bent in all directions, and the strain is most severe at the junction of the casing with the rigid coupling sleeves or collars, where the flexibility of both shaft and casing terminates and allows such shaft or casing to bend at a more or less sharp or abrupt angle, thereby destroying the integrity of the casing at this junction and frequently causing the shaft to break.

The object of my invention is to provide one or both of the collars or couplings at the ends of the flexible shaft with an attachment or flexible support which embraces the flexible casing at points some distance from the junction of the casing with the coupling and is more or less resilient to allow the shaft to bend gradually, thereby avoiding short kinks or sharp bends in the casing or its rotary shaft.

Another object is to produce a yielding support which may be attached to or detached from the coupling and possess a resiliency or flexibility which gradually increases from the coupling toward its free end—that is, the portion of the attachment most remote from the coupling is more resilient or flexible than that part which is closer to the coupling.

Other objects and uses will appear in the following description.

Figure 1:
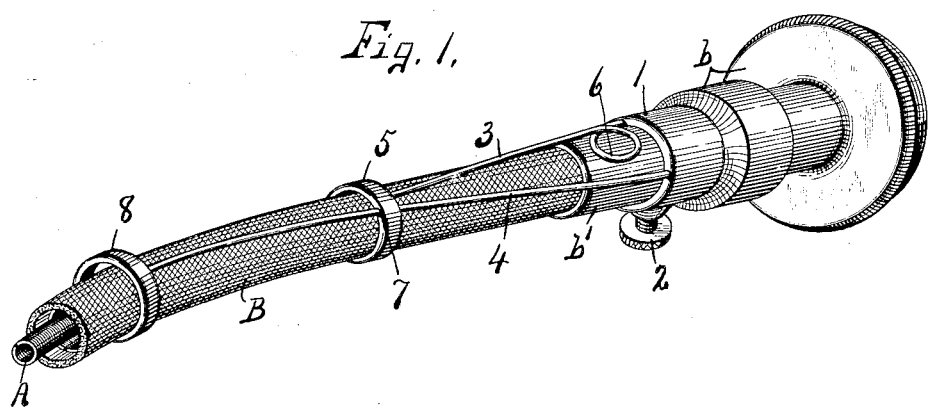
Figure 2:
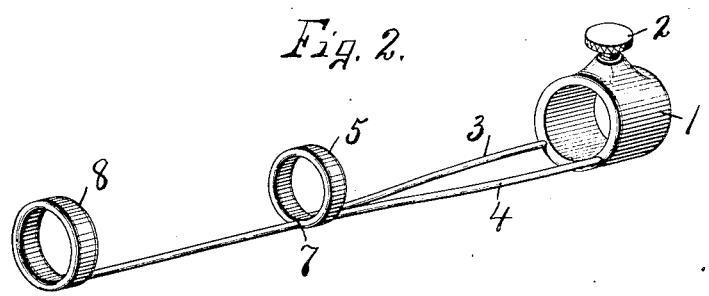
Figure 3:
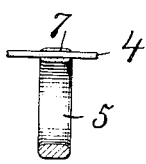

In the drawings, Figure 1 is a perspective view of one end of a flexible shaft and its flexible casing having a coupling-head and my improved flexible support attached thereto and embracing the adjacent portion of the flexible casing. Fig. 2 is a perspective view of the detached flexible support seen in Fig. 1 except that the loop or coil in the shorter spring arm or leg is omitted. Fig. 3 is a longitudinal sectional view through the intermediate ring or collar, showing a portion of the longer spring-arm as passing loosely through an aperture in said ring.

A represents a flexible shaft which is inclosed by a flexible casing B, having one end secured to a metal coupling or sleeve $b$, by which the casing may be attached to any suitable support for the driving or driven elements. This coupling-section is shown as provided with a somewhat elongated cylindrical portion $b'$; and upon this cylindrical portion $b'$ is fitted a metal collar 1, which is detachably secured in place by a set-screw 2. Secured to one end of this collar 1 are two spring-arms 3 and 4, which extend beyond the cylindrical sleeve $b'$ along the flexible casing B, the spring-arm 3 being shorter than and in this instance substantially half the length of the spring-arm 4, and to its free end is rigidly secured a second ring 5, which encircles the flexible casing B some distance from the adjacent end of the cylindrical sleeve $b'$. The interior diameter of this ring 5 is slightly greater than the diameter of the flexible casing B, so as to allow free sliding movement of one upon the other as the shaft is bent or twisted. In order to allow for greater flexibility of the spring-arm 3 and prevent its kinking and buckling, I usually provide it with a coil or loop 6, which is preferably located near the collar 1 to relieve the strain at this point, and thereby prevent crystallization or breakage of the spring. This is not necessary, however, as both the spring-arms 3 and 4 between the collars 1 and 5 are more or less bowed—that is, the portions of said arms which are connected to the collar 5 are close together, while their ends which are attached to the collar 1 are separated some distance apart, and their intermediate portions therefore diverge from the collar 5 toward the collar 1, which in most instances allows ample flexibility and prevents kinking or buckling of these spring-arms.

The spring-arm 4 has a sliding connection with the ring 5 and is preferably passed through an aperture 7 in one side of the ring adjacent to the junction of the adjacent arm of the ring 3 with said ring, which permits said ring 5 and spring-arm 4 to slide one upon the other as the arms 3 and 4 are bent in different directions by the bending of the flexible casing B and shaft A. This spring-arm 4 extends through the aperture 7 and some distance beyond the ring 5, and its free end is rigidly secured to one side of a third ring 8, which also encircles the flexible shaft B some distance from the ring 5, this distance in this instance being substantially the same as the distance between the ring 5 and collar 1.

It now appears that the ring 5 is connected to the collar 1 by two spring-arms 3 and 4, while a single wire or spring-arm extends between the rings 5 and 8, and therefore the flexibility or resiliency of the attachment between the rings 5 and 8 is greater than it is between the rings 5 and 1; but owing to the fact that the spring-wires 3 and 4 are brought closer together at their junctions with the ring 5 than at their junctions with the collar 1 the resiliency of the two arms near the ring 5 is greater than it is at the ring 1, this resiliency gradually increasing from the ring 5 to the collar 1 by reason of the divergence of the spring-arms 3 and 4. It therefore follows that the resiliency of the support as a whole gradually diminishes from the ring 8 to the collar 1. This ring 8 is of slightly greater interior diameter than the ring 5 and casing B in order to provide for a greater flexibility of this end of the support and for the consequent greater sliding action of the ring 8 and casing B one upon the other. It is now evident that when the free end of the flexible shaft and casing are bent in any direction the portion of the yielding support, as the spring-wire 4 between the rings 5 and 8, is the first to yield or conform to the bend in the flexible shaft-casing by reason of its greater resiliency and that as the shaft-casing continues to bend in the same direction this resiliency is transmitted to the portions of the spring arms or wires 3 and 4 between the ring 5 and collar 1, thereby preventing short kinks or sharp bends in the flexible casing or shaft and prolonging the life of these parts.

Having thus described my invention, what I claim, and desire to secure by Letters Patent, is—

1. In combination with a flexible-shaft casing and coupling-section secured thereto, a collar secured to the coupling-section, spring-arms attached to the collar and extending along the casing, and rings attached to the arms and embracing the casing.

2. In combination with a flexible-shaft casing, and a coupling-section secured thereto, a collar attached to the coupling-section, spring-arms secured to and converging from the collar and extending along one side of the casing and a ring on each of the spring-arms and embracing the casing.

3. In combination with a flexible-shaft casing, and a coupling-section secured thereto, a collar attached to the coupling-section, a spring-arm secured to the collar and extending along one side of the casing, a ring on said spring-arm and embracing the casing, and a second ring loosely connected to the spring-arm and embracing the casing between the first-named ring and collar.

4. In combination with a flexible-shaft casing and a coupling-section secured thereto, a collar attached to the coupling-section, a spring-arm secured at one end to the collar, and two rings mounted on the spring-arm at different distances from the collar and encircling the shaft-casing.

5. In combination with a flexible-shaft casing and a coupling-section secured thereto, a collar attached to the coupling-section, a ring encircling the casing and a spring-arm having one end connected to the ring and its other end secured to the collar, said spring-arm being provided with a coil or loop between the collar and ring to relieve the strain on the spring at its junction with the collar.

6. An attachment for flexible-shaft casings comprising two spring-arms of unequal lengths and means for clamping them at one end to the casing, and separate devices on their opposite ends embracing the casing.

7. An attachment for flexible-shaft casings comprising a collar and two spring-arms projecting therefrom, and separate devices one on each spring embracing the casing.

8. An attachment for flexible-shaft casings comprising two spring-arms, means rigidly connecting said arms, additional means rigidly secured to one spring-arm and loosely connected to the other spring-arm, and a ring on one of the spring-arms embracing the casing.

9. In combination with the flexible case and a fixed collar, separate rings encircling the flexible casing and separate spring-arms secured to the collar, each spring-arm having one end secured to one of the rings.

10. In combination with a flexible-shaft case and a collar, a spring-arm having one end secured to the collar and its other end extending along the flexible case, a ring or collar encircling the case, a second spring secured to the collar and of less length than the first-named spring, a ring on the second spring having loose connection with the flexible casing, and also with the first-named spring.

11. An attachment for flexible-shaft casings comprising a collar, spring-arms of unequal length attached at one end to the collar, a ring attached to the other end of the longer spring, and a second ring attached to the shorter spring and having an aperture through which the longer spring is inserted.

12. An attachment for flexible-shaft casings comprising two spring-arms fixed at one end, a ring fixed to one spring-arm and loosely connected to the other spring-arm.

In witness whereof I have hereunto set my hand this 9th day of January, 1905.

ALVAH U. PATCHEN.

Witnesses:
H. E. CHASE,
HOWARD P. DENISON.